US012681188B2

(12) United States Patent
Becheret et al.

(10) Patent No.: US 12,681,188 B2
(45) Date of Patent: Jul. 14, 2026

(54) SATELLITE NAVIGATION METHOD WITH SATELLITE FAILURE DETECTION BY STATISTICAL PROCESSING OF CROSS-INNOVATION

(71) Applicant: SAFRAN ELECTRONICS & DEFENSE, Paris (FR)

(72) Inventors: Yves Becheret, Moissy-Cramayel (FR); Maxime Nguyen, Moissy-Cramayel (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 229 days.

(21) Appl. No.: 18/719,478

(22) PCT Filed: Dec. 14, 2022

(86) PCT No.: PCT/EP2022/085929
§ 371 (c)(1),
(2) Date: Jun. 13, 2024

(87) PCT Pub. No.: WO2023/111063
PCT Pub. Date: Jun. 22, 2023

(65) Prior Publication Data
US 2025/0067878 A1 Feb. 27, 2025

(30) Foreign Application Priority Data
Dec. 14, 2021 (FR) ...................................... 2113491

(51) Int. Cl.
*G01S 19/20* (2010.01)
*G01S 19/39* (2010.01)

(52) U.S. Cl.
CPC ............ *G01S 19/20* (2013.01); *G01S 19/393* (2019.08)

(58) Field of Classification Search
CPC ................................. G01S 19/20; G01S 19/393
USPC ....................................................... 342/357.58
See application file for complete search history.

(56) References Cited

U.S. PATENT DOCUMENTS 7,769,543 B2 8/2010 Stecko et al.
2018/0224519 A1 * 8/2018 Sendonaris ............. G01S 19/24

FOREIGN PATENT DOCUMENTS

| CN | 107110975 A | * | 8/2017 | .......... G01S 19/423 |
|----|-------------|---|--------|-----------------------|
| FR | 2939901 A | | 6/2010 | |
| FR | 2943869 A | | 10/2010 | |
| FR | 2947900 A1 | | 1/2011 | |
| FR | 2964468 A1 | | 3/2012 | |
| FR | 3095693 A1 | * | 11/2020 | ............. G01S 19/20 |

(Continued)

*Primary Examiner* — Harry K Liu
(74) *Attorney, Agent, or Firm* — MUNCY, GEISSLER, OLDS & LOWE, P.C.

(57) ABSTRACT

A navigation method using a plurality of pseudo-measurements obtained from satellite signals, the method implementing a Kalman filter bank having a main filter calculating a main navigation solution from the pseudo-measurements originating from satellites, and sub-filters each calculating a secondary navigation solution, and at least one innovation of the pseudo-measurements for each non-excluded satellite and a cross-innovation. An indicator is determined from the sensitivity of the cross-innovation to the innovations of the non-excluded pseudo-measurements. A corresponding navigation system and to a vehicle equipped with same are also provided.

11 Claims, 1 Drawing Sheet

(56) References Cited

FOREIGN PATENT DOCUMENTS

| WO | WO2010/070012 A | 6/2010 | |
|----|-----------------|--------|--------------|
| WO | WO2010108938 A1 | 9/2010 | |
| WO | WO2011/003994 A | 1/2011 | |
| WO | WO-2017003670 A1 * | 1/2017 | ......... G01N 29/4418 |

* cited by examiner

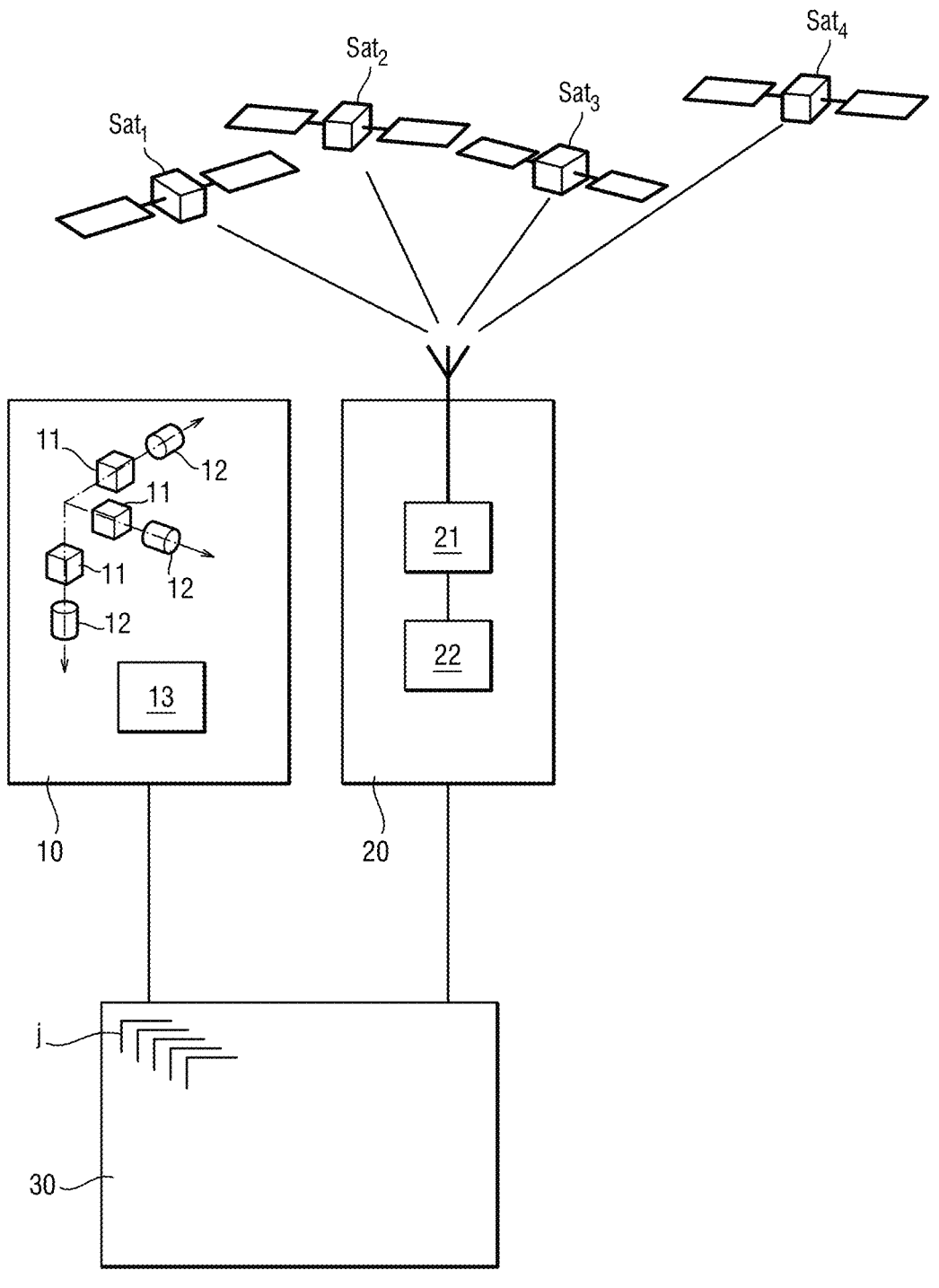

SATELLITE NAVIGATION METHOD WITH
SATELLITE FAILURE DETECTION BY
STATISTICAL PROCESSING OF
CROSS-INNOVATION

BACKGROUND OF THE INVENTION

Field of the Invention

The present invention relates to the field of vehicle
navigation, more particularly on the basis of signals origi-
nating from satellites of a satellite constellation of a global
navigation satellite system (or GNSS) such as the GPS,
GALILEO, GLONASS or BEIDU system.

Brief Discussion of the Related Art

Vehicle navigation is usually carried out by means of a
navigation algorithm configured to determine spatial infor-
mation regarding location and orientation (position, speed,
attitude information) and also horizontal and vertical posi-
tional protection limits, on the one hand on the basis of
inertial measurements originating from a signal processing
circuit of an inertial measurement unit and on the other hand
on the basis of pseudo-measurements determined on the
basis of the receipt of positioning satellite signals.

The inertial measurement unit conventionally comprises
accelerometers disposed along the axes of a measurement
frame of reference in order to provide specific force incre-
ments, and gyrometers disposed to provide rotational incre-
ments of the measurement frame of reference with respect to
an inertial frame of reference.

On their own, the signals originating from the inertial
measurement unit serve to maintain spatial information,
which are the position, the speed, and the attitude of the
vehicle. Navigation on the basis of purely inertial spatial
information is accurate in the relatively short term, but tends
to drift in the relatively long term.

Each satellite signal comprises information identifying
the transmitting satellite, the satellite clock, an ephemeris,
information about the satellite's orbit, and ionospheric
parameters, etc. The time of flight of the satellite signal (start
time provided by the satellite clock and arrival time pro-
vided by the receiver clock) makes it possible to determine
a pseudo-distance between the satellite and the receiver. By
having pseudo-distances available for several satellites, it is
possible to determine spatial information, namely the posi-
tion of the vehicle or, more precisely, of its satellite signal
receiver. Navigation using purely satellite-based spatial
information is accurate in the relatively long term.

The navigation algorithm generally comprises a Kalman
filter configured to use both the inertial data and the pseudo-
measurements and to provide a navigation solution in the
form of a navigation state vector the components of which
are the spatial information (commonly referred to as hybrid-
ization).

However, the failure of one or more satellites (a satellite
is down when the information contained in the signals that
it transmits leads to the calculation of an erroneous pseudo-
measurement) can have a significant impact on the spatial
information obtained after hybridization. To overcome this
problem, a single Kalman filter is not used, but rather a bank
of Kalman filters in parallel comprising a main filter calcu-
lating a main navigation solution on the basis of all the
available pseudo-measurements and secondary filters (or
sub-filters) each calculating a secondary navigation solution
on the basis of the available pseudo-measurements except one. Thus, each sub-filter excludes pseudo-measurements
from one of the satellites and is therefore theoretically
immune to the failure of the satellite from which it excludes
the pseudo-measurements.

The use of main and secondary Kalman filter banks is
known, for example, from documents FR-A-2939901 and
WO-A-2011/003994.

In order to detect and exclude a satellite failure, it is
known, in particular from document FR-A-2943869, to
implement an integrity algorithm which, for each filter in the
filter bank:

calculates a cross-innovation reflecting the difference
       between an observation corresponding to a raw mea-
       surement obtained from a satellite excluded by the filter
       and an a posteriori estimate of said observation
       obtained from the navigation solution produced by the
       filter;
    carries out a statistical test of the cross-innovation in order
       to declare whether or not the satellite the raw measure-
       ment of which is not being used by the filter is faulty.

SUMMARY OF THE INVENTION

The invention has the particular aim of improving the
integrity of navigation methods based on satellite signals, by
limiting the risk of false detection.

To this end, a navigation method on the basis of a plurality
of pseudo-measurements obtained from positioning satellite
signals is provided, each signal originating from a satellite.
The method employs a Kalman filter bank comprising a
main filter calculating a main navigation solution from the
pseudo-measurements obtained from the satellites and the
sub-filters each calculating:

a secondary navigation solution on the basis of pseudo-
       measurements obtained from satellites, excluding
       therefrom the pseudo-measurement obtained from at
       least one satellite, and
    a pseudo-measurement innovation for each remaining
       satellite,
    a cross-innovation reflecting the difference between an
       observation corresponding to the pseudo-measurement
       excluded by the sub-filter and an a posteriori estimate
       of said observation obtained from the secondary navi-
       gation solution produced by the sub-filter.

In accordance with the invention, the method comprises
the steps of:

calculating a sensitivity of the cross-innovation to errors
       in the pseudo-measurement innovations which are not
       excluded;
    deducing therefrom coefficients for the sensitivity of each
       sub-filter to the pseudo-measurements for each of the
       satellites;
    forming a satellite failure indicator on the basis of the
       sensitivity coefficients for each sub-filter to the pseudo-
       measurements for each satellite and comparing the
       satellite failure indicator with a threshold in order to
       determine whether the satellite has failed.

In some particular geometrical configurations of the sat-
ellites, and in the case of a failure on one of them, it may
transpire that several cross-innovations are high, even
though there is only one failure. This is due to the fact that,
in the event of a satellite failure, each sub-filter using the
pseudo-measurement for the failed satellite is affected by the
pseudo-measurement in question. As a result, the cross-
innovation calculated by each sub-filter using the pseudo-
measurement for the failed satellite may also be affected.
Thus, erroneous selections of failed satellites are limited by taking into account the sensitivity of each cross-innovation to errors on the satellites used by the sub-filter that calculates said cross-innovation. The satellite with the highest sensitivity indicator could be considered to be faulty with a lower risk of error. It is therefore possible to reduce cases of incorrect selection of failed satellites and to improve the validity of the tests carried out on the basis of cross-innovation.

Other characteristics and advantages of the invention will become apparent from a study of the description below of a particular and non-limiting embodiment of the invention.

BRIEF DESCRIPTION OF THE DRAWING

Reference shall be made to the sole accompanying FIGURE:

The sole FIGURE schematically shows the execution of the method of the invention.

DETAILED DESCRIPTION OF THE INVENTION

With reference to the sole FIGURE, the invention concerns a navigation system comprising an inertial measuring unit 10, a satellite navigation device 20 and an electronic navigation calculation unit 30. The navigation system is, for example, on board a vehicle such as an aircraft, a marine vessel or a land vehicle.

The inertial measuring unit 10 conventionally comprises accelerometers 11 disposed along the axes of a measurement frame of reference in order to provide specific force increments and gyrometers 12 configured to provide angular increments representative of the rotation of the measurement frame of reference with respect to the three axes of an inertial frame of reference. The accelerometers and gyrometers are connected to an electronic circuit 13 for processing said signals. The electronic processing circuit 13 of the inertial measuring unit 10 is connected to the electronic navigation calculation unit 30 and supplies the latter with inertial data representative of the aforementioned increments.

In known manner, the satellite navigation device 20 (more precisely referred to as "satellite radio-navigation") comprises a satellite positioning signal receiver 21 and an electronic processing circuit 22 for receiving and processing the satellite positioning signals originating from satellites Sat$_i$ varying from 1 to 4 in the FIGURE) of a constellation such as that of the GPS, GALILEO, GLONASS and BEIDU systems. The electronic processing circuit 22 of the satellite navigation device 20 is connected to the electronic navigation calculation unit 30 and supplies the latter with satellite data containing pseudo-measurements for each satellite from which a signal has been received and the positions of each of the satellites from which the signal has been received. The pseudo-measurements comprise a pseudo-distance determined from the time of flight of the signal and a pseudo-speed determined by the Doppler effect. It should be noted that, in a manner which is known per se, the electronic processing circuit 22 of the satellite navigation device 20 may select satellites from among the set of visible satellites so as to optimize certain precision criteria (such as, for example, the DOP, EHE, EVE parameters defined by the Navstar GPS system documentation) and transmit only the satellite data for the selected satellites to the electronic navigation calculation unit 30.

The electronic navigation unit 30 comprises a processor and a memory containing a least one program possessing instructions for executing the navigation method.

The electronic navigation calculation unit 30 is therefore configured to calculate:

a priori pseudo-measurements, calculated from inertial data and from the position of each satellite, differences (termed observations) between the a priori pseudo-measurements and the pseudo-measurements provided by the satellite navigation device 20.

The method uses a Kalman filter bank in parallel in order to carry out the hybridization of the inertial data and the satellite data in order to provide a navigation solution and statistical information.

It will be recalled that a Kalman filter is a recursive estimator executing successive iterations each comprising a prediction (or propagation) operation and an updating (or resetting) operation.

The prediction operation is designed to calculate:

an a priori output state vector on the basis of the input state vector and a transition model representative of the motion of the carrier, and an associated covariance matrix on the basis of the transition model.

The input state vector includes inertial navigation error states and a pseudo-measurement error state per satellite used by the Kalman filter.

The updating (or resetting) operation is designed to transform the a priori output state vector into an a posteriori output state vector on the basis of observations (the pseudo-measurements) and from an observation model representative of the noise of the observations. The associated covariance matrix is also updated during the updating operation. The a posteriori output state vector constitutes a navigation solution for the filter in question.

In summary, each Kalman filter therefore carries out successive resets of the inertial position as a function of the pseudo-measurements. The order of the resets is determined as a function of the rank of each satellite in a list in which each of the satellites is classified as a function of the estimated accuracy of the pseudo-measurement corresponding to that satellite. Each satellite is identified by an index i representative of its rank in the list (this rank is also termed the PRN).

Here, the Kalman filter bank comprises:

a main Kalman filter using all the available pseudo-measurements and observations (for example n), and n secondary Kalman filters, or sub-filters j, each using all the pseudo-measurements and observations except those relating to a satellite which is excluded from the sub-filter.

Thus, in a manner which is known per se, the main filter uses the pseudo-measurements for satellites 1 to n and provides a hybridized main navigation solution.

In a manner which is known per se, each sub-filter j uses the pseudo-measurements for the satellites of rank i such that i is different from j, the pseudo-measurements for the satellite i=j therefore being excluded, in order to provide a hybridized secondary navigation solution. Thus, the sub-filter 1 uses the pseudo-measurements for the satellites of rank 2 to n; the sub-filter 2 uses the pseudo-measurements for the satellites of rank 1 and 3 to n; the sub-filter 3 uses the pseudo-measurements for the satellites of rank 1, 2 and 4 to n, and so on up to the sub-filter n which uses the pseudo-measurements for the satellites of rank 1 to n−1.

In addition, each Kalman filter provides, in a manner which is known per se, for each satellite the pseudo-measurements for which it uses:

an innovation, i.e., a difference between an a priori observation and an a posteriori observation produced by the filter;

a covariance of the pseudo-measurement error after correction by the Kalman filter in proportion to the innovations of the pseudo-measurements.

But, in a manner which is known per se, each sub-filter j also provides a cross-innovation, i.e., the difference between an a priori observation originating from the satellite i (i=j) excluded by said sub-filter j and an a posteriori observation produced by the sub-filter j, as well as a covariance of the cross-innovation. As an example, the sub-filter 1 calculates the difference between a pseudo-measurement for the satellite 1 provided by the satellite navigation device 20 and an a posteriori estimation of this pseudo-measurement determined by the sub-filter 1 which does not use the observations from satellite 1, so that a failure of satellite 1 does not affect the calculation of the cross-innovation.

For sub-filter 1, we then have:

the cross-innovation $CrossInno_1$ such that $$CrossInno_1 = PZ - H_1 * X_{1+}.$$

in which $PZ$ is the difference between the measured pseudo-measurement and the pseudo-measurement estimated by the main filter, $H_1$ is the row vector of the observation matrix of the first observation for the sub-filter 1, $X_{1+}$ is the state vector after carrying out the n updates for sub-filter 1;

the covariance $CovCrossInno_1$ such that $$CovCrossInno_1 = H_1 * P_1 * H_1^T + R^2$$

in which $H_1$ is the row vector of the observation matrix corresponding to the first observation (that for satellite i=1), $P_1$ is the matrix for a posteriori estimation of the covariance of the error corresponding to the first observation (that for satellite i=1), $R$ is the covariance matrix of the noise measurement.

In a manner which is known per se, each Kalman filter also provides a gain of the filter and of the transition and observation matrices.

The operation of the electronic processing unit 30 with regard to the production of the reference navigation, the use of the filters and the correction of the inertial data by a stabilization vector obtained from correction vectors estimated by the Kalman filters is known per se and is in accordance here with documents FR-A-2943869, WO-A-2010/070012 or FR-A-2964468.

In accordance with the invention, cross-innovation sensitivity coefficients are to be determined for each sub-filter. The cross-innovation sensitivity coefficients are representative of the influence of an error of each satellite forming part of the estimated pseudo-measurement calculation carried out by said sub-filter.

The cross-innovation sensitivity of satellite i=j with respect to the sub-filter "j" to the innovations of the pseudo-measurements observed by the satellites "i" (i≠j) can be written in the form of the following sensitivity equation:

$$X_+ = \prod_n^1 (I - K_i * H_i) * X_- + \sum_{i=1}^{n-1}\left(\prod_n^{k=i+1}(I - K_k * H_k)\right) * K_i * y_i + K_n * y_n$$

in which:

i is the sequence number for the satellite in question for carrying out pseudo-measurement resets (or the PRN number), i varying from 1 to n;

n is the number of satellite pseudo-measurements used by the sub-filters;

I is the identity matrix;

$K_i$ is the column vector for the reset gains of the $i^{th}$ resetting cycle of pseudo-measurements by the Kalman filter with separation of the observations used;

$H_i$ is the row vector for the observation equation for the $i^{th}$ observation;

$y_i$ is the observed data (pseudo-measurement); $X_-$ is the state vector before carrying out the n resets;

$X_+$ is the state vector after carrying out the n resets.

The value for the gain K is between 0 and 1. The values for the gain K are higher if the observation conditions of the satellite concerned are good: the better the observation conditions of a satellite, the better can information obtained via this satellite be used.

Thus, the smaller the PRN number of the satellite, the higher the gain K.

The more developed sensitivity equation therefore takes the following form:

$$X+=(I-K_n*H_n)*(I-K_{n-1}*H_{n-1})* \ldots *(I-K_2*H_2)*(I-K_1*H_1)*X_-+(I-K_n*H_n)*(I-K_{n-1}*H_{n-1})* \ldots *(I-K_2*H_2)*K_1*y_1+(I-Kn*Hn)*(I-Kn-1*Hn-1)* \ldots *(I-K_3*H_3)*K_2*y_2 \ldots +(I-K_n*H_n)*K_{n-1}*y_{n-1}+K_n*y_n$$

For each sub-filter j, the value of $y_{i=j}$ is set to 0. Thus, in the sensitivity equation for the sub-filter 1 which excludes the observations for the satellite 1, $y_1=0$ is set instead of using the true value of $y_1$, so that the terms $(I-K_n*H_n)*(I-K_{n-1}*H_{n-1})* \ldots *(I-K_2*H_2)*K_1$ are eliminated from the equation.

Sensitivity coefficients for each sub-filter j to the measurements for each satellite i are deduced therefrom, i and j varying from 1 to n.

The sensitivity coefficient $Cs_i$ for each satellite PRN(i<n) is equal to $$\prod_{k=n}^{k=i+1}(I - K_k * H_k) * K_i$$

and the sensitivity coefficient $Cs_i = K_n$ for the satellite i=n.

A row vector $S_{ij}$ associating the sensitivity coefficient for each satellite i and the measurements $H_j$ used in the sub-filter j is then calculated for each sub-filter j, i.e. $S_{ij} = H_j * Cs_i$ for i≠j, and it is assumed that $S_{ij}=1$ for i=j.

By aggregating the row vectors, a matrix SS is obtained such that $$SS = \begin{bmatrix} S_{11} = 1 & \ldots & S_{1n} = H_n * \prod_{k=n}^{k=2}(I - K_k * H_k) * K_1 \\ \vdots & \ddots & \vdots \\ S_{n1} = H_1 * K_n & \ldots & S_{nn} = 1 \end{bmatrix}$$

The following are calculated for each cross-innovation associated with each sub-filter j:

ts variance in the absence of failure $\sigma_j^2$, via the post-calibration covariance matrix $P_j^+$ calculated by the sub-filter j such that $\sigma_j^2 = H_j * P_j^+ * H_j^t$, in which $H_j$ is the row vector of the observation equation for the observation for the satellite i=j not used by the sub-filter j;

its variance in the noise measurement $r_j^2$, already available because it is used by the main filter.

A failure detection indicator is then formed. The indicator is defined as follows:

$$\frac{\left(\sum_{i=1}^{n} S_{ij} y_i\right)^2}{\left(\sum_{i=1}^{n} |S_{ij}\sigma_i|\right)^2 + \sum_{i=1}^{n}\left(S_{ij}^2 r_i^2\right)}$$

The indicator is then compared with a threshold calculated in a manner which is known per se as a function of the desired probability of false detection, here with an assumed Gaussian distribution centered on the absence of failure.

If the indicator of satellite i is greater than the threshold, then satellite i is declared to be out of order.

Thus, there are as many indicators as there are satellites. Preferably, the threshold is the same for all satellites.

Naturally, the invention is not limited to the embodiment described, but covers any variation falling within the scope of the invention as defined by the claims.

In particular, although the invention has been described in the context of hybrid inertial/satellite navigation (or INS/GNSS), the invention is applicable to other types of hybrid navigation, but also to non-hybrid satellite navigation.

As indicated, it is possible to select the satellites the pseudo-measurements of which are employed. In particular, to this end, it is advantageous to identify, for each sub-filter, pairs of satellite PRNs which are not to be used because they are placed in opposite positions on the same orbit. In fact, signals originating from these two satellites will never be available at the same time.

It is possible to exclude more than one satellite per sub-filter and to calculate several cross-innovations per sub-filter.

The invention claimed is:

1. A method for navigation on the basis of a plurality of pseudo-measurements obtained from satellite positioning signals each originating from a satellite, using a Kalman filter bank comprising a main filter calculating a main navigation solution from pseudo-measurements obtained from satellites and sub-filters each calculating:

a secondary navigation solution on the basis of pseudo-measurements obtained from satellites, excluding therefrom the pseudo-measurements obtained from at least one satellite, and at least a pseudo-measurement innovation for each remaining satellite, a cross-innovation reflecting the difference between an observation corresponding to the pseudo-measurement excluded by the sub-filter and an a posteriori estimate of said observation obtained from the secondary navigation solution produced by the sub-filter, wherein the method comprises the steps of:

determining a sensitivity equation reflecting a sensitivity of the cross-innovation to non-excluded pseudo-measurement innovations;

extracting coefficients for the sensitivity ($Cs_i$) of each sub-filter to pseudo-measurements for each satellite (i) from the sensitivity equation;

forming a satellite failure indicator on the basis of the sensitivity coefficients ($Cs_i$) for each sub-filter to the pseudo-measurements for each satellite (i) and comparing the satellite failure indicator with a threshold in order to determine whether the satellite has failed.

2. The method as claimed in claim 1, in which the sensitivity equation is as follows:

$$X_+ = \prod_{n}^{1}(I - K_i * H_i) * X_- + \sum_{i=1}^{n-1}\left(\prod_{n}^{k=i+1}(I - K_k * H_k)\right) * K_i * y_i + K_n * y_n$$

in which:

i is a sequence number of a reset carried out on the basis of data from satellite i among a set of n resets carried out by a sub-filter, i varying from 1 to n;

n is the number of pseudo-distance measurements used by the sub-filters and therefore the number of resets made by each sub-filter;

I is the identity matrix;

$K_i$ is a column vector for reset gains of reset i of the pseudo-distances by the sub-filter;

$H_i$ is a row vector for an observation equation corresponding to the pseudo-distance measurement of satellite i;

$y_i$ is the pseudo-distance measurement for satellite i;

$X_-$ is the state vector before carrying out the n resets;

$X_+$ is the state vector after carrying out the n resets.

3. The method as claimed in claim 2, in which the sensitivity coefficient $Cs_i$ for each satellite of rank i is equal to $$\prod_{k=n}^{k=i+1}(I - K_k * H_k) * K_i$$

and the sensitivity coefficient $Cs_i = K_n$ for the satellite with rank n.

4. The method as claimed in claim 3, in which the calculation of the indicator comprises the step for calculating for each sub-filter (j) a row vector ($S_{ij}$) associating the sensitivity coefficient for each satellite (i) and the measurements ($H_j$) used in the sub-filter, i.e. $S_{ij} = H_j * Cs_i$ for i≠j and assuming that $S_{ij} = 1$ for i=j.

5. The method as claimed in claim 4, in which the row vectors are aggregated to form the matrix SS such that:

$$SS = \begin{bmatrix} S_{11} = 1 & \dots & S_{1n} = H_{n\square} * \prod_{k=n}^{k=2}(I - K_k * H_k) * K_1 \\ \vdots & \ddots & \vdots \\ S_{n1} = H_1 * K_n & \dots & S_{nn} = 1 \end{bmatrix}.$$

6. The method as claimed in claim 5, in which the indicator is defined as follows:

$$\frac{\left(\sum_{i=1}^{n} S_{ij} y_i\right)^2}{\left(\sum_{i=1}^{n} |S_{ij}\sigma_i|\right)^2 + \sum_{i=1}^{n}\left(S_{ij}^2 r_i^2\right)}$$

in which j is the index for the sub-filter concerned, $\sigma_i$ is the standard deviation in the absence of failure of the pseudo-distance measurement innovation excluding satellite i, $r_i^2$ is the variance for the noise measurement.

7. The method as claimed in claim 1, in which the threshold is identical for all of the satellites.

8. The method as claimed in claim 1, in which the threshold can be adjusted as a function of a desired probability of false detection in the absence of failure.

9. The method as claimed in claim 1, in which the threshold is calculated as a function of a desired probability of false detection based on a centered Gaussian distribution assumption in the absence of a failure.

10. A navigation system comprising an electronic navigation calculation unit and a satellite navigation device connected to the electronic navigation calculation unit, the electronic navigation calculation unit using a bank of Kalman filters and being configured to carry out the method as claimed in claim 1.

11. A vehicle with the on-board navigation system as claimed in claim 10.

* * * * *